United States Patent
Chiquet et al.

(10) Patent No.: US 6,626,011 B2
(45) Date of Patent: *Sep. 30, 2003

(54) METHOD OF MANUFACTURING A MONOMODE FLUORIDE OPTICAL FIBER, AND AN OPTICAL AMPLIFIER USING SUCH A FIBER

(75) Inventors: Frédéric Chiquet, Massy (FR); Marylise Le Thuaut, Elancourt (FR); Jean-Jacques Girard, St-Germain-les-Arpajon (FR); Pascal Baniel, Draveil (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 47 days.

(21) Appl. No.: 09/068,540

(22) PCT Filed: Nov. 7, 1996

(86) PCT No.: PCT/FR96/01752

§ 371 (c)(1),
(2), (4) Date: May 13, 1998

(87) PCT Pub. No.: WO97/18169

PCT Pub. Date: May 22, 1997

(65) Prior Publication Data

US 2001/0045109 A1 Nov. 29, 2001

(30) Foreign Application Priority Data

Nov. 13, 1995 (FR) .............................................. 95 13416

(51) Int. Cl.⁷ ............................................ C03B 37/027
(52) U.S. Cl. ............................ 65/388; 65/412; 428/428; 428/227; 428/691; 428/696; 385/123; 385/142
(58) Field of Search .................... 65/388, 412; 428/428, 428/227, 691, 696; 385/123, 142

(56) References Cited

U.S. PATENT DOCUMENTS

| 3,877,912 A | * | 4/1975 | Shiraishi ...................... 65/412 |
| 4,283,213 A | | 8/1981 | Akers et al. |
| 4,596,589 A | | 6/1986 | Perry |

(List continued on next page.)

FOREIGN PATENT DOCUMENTS

| EP | 0 568 097 A1 | 11/1993 | |
| GB | 1 473 779 | 5/1977 | |
| GB | 2 071 351 A | 9/1981 | |
| JP | 53125853 | * 11/1978 | .................. 65/412 |
| JP | 56-44024 | * 10/1981 | .................. 65/412 |
| WO | WO 89/00707 | 1/1989 | |

OTHER PUBLICATIONS

US 5,779,759, 7/1998, Chiquet (withdrawn)*
Patent Abstracts of Japan, vol. 18, No. 288 (C–1207), Jun. 2, 1994 corresponding to JP A 06 056473 (Furukawa Electric Co., Ltd.).
Patent Abstracts of Japan, vol. 18, No. 625 (C–1279), Nov. 29, 1944 corresponding to JP A 06 239637 (NT&T Corp.).
Journal of Materials Science Letters, vol. 10, No. 4, Feb. 15, 1991, London, GB, pp. 241–242, W. J. Cho et al, Fibre–in tube casting for single–mode fluoride glass fibre.

*Primary Examiner*—John Hoffmann
(74) *Attorney, Agent, or Firm*—Sughrue Mion, PLLC

(57) ABSTRACT

The invention provides a monomode optical fiber and a monomode preform (2) having a mother preform (22) housed in an outer sleeve tube (20). It is characterized in that it also includes an intermediate tube (21) between the mother preform (22) and the outer tube (20), the intermediate tube (21) possessing viscosity at fiber-drawing temperature which is less than the viscosity(ies) at fiber-drawing temperature of the mother preform (22) and of the outer tube (20). The invention also provides a method of manufacturing a monomode optical fiber. The fiber has a core that is better centered and less deformed than in the prior art. An application of the invention lies in making an optical amplifier.

14 Claims, 3 Drawing Sheets

U.S. PATENT DOCUMENTS

| | | | | |
|---|---|---|---|---|
| 4,938,562 A | * | 7/1990 | Vacha | 65/388 |
| 4,975,102 A | * | 12/1990 | Edahiro et al. | |
| 4,978,377 A | * | 12/1990 | Brehm | 65/412 |
| 5,560,759 A | * | 10/1996 | Kortan | 65/412 |
| 5,573,571 A | * | 11/1996 | Kopylov | 65/388 |
| 5,618,326 A | * | 4/1997 | Szebesta | 65/388 |
| 5,656,056 A | * | 8/1997 | Braglia | 65/388 |
| 5,958,103 A | * | 9/1999 | Yoneda | 65/412 |

* cited by examiner

FIG. 2
FIG. 3
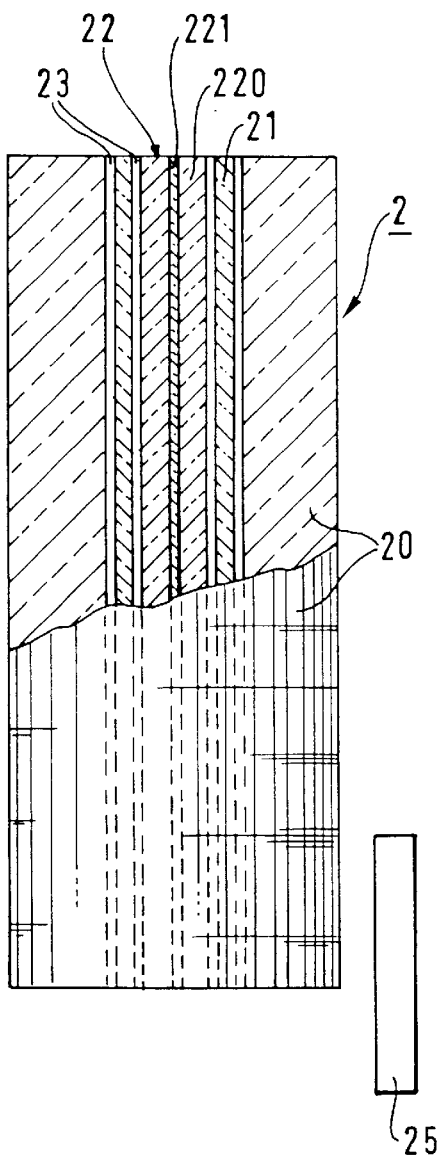
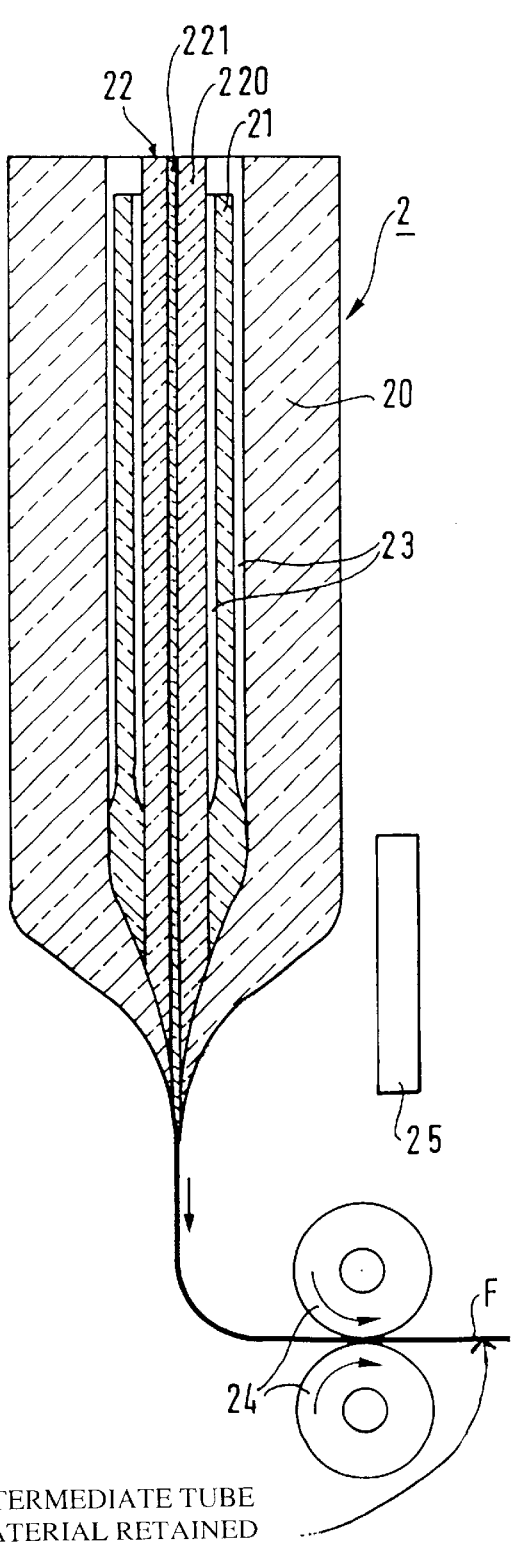
INTERMEDIATE TUBE
MATERIAL RETAINED

METHOD OF MANUFACTURING A MONOMODE FLUORIDE OPTICAL FIBER, AND AN OPTICAL AMPLIFIER USING SUCH A FIBER

The present invention relates in general to manufacturing a monomode preform and to the corresponding monomode optical fiber. It is applicable to the field of optical fiber telecommunications. By way of non-limiting example, it applies to polymer, fluoride glass, etc . . . technologies. In particular, the invention can be used in making economically viable optical amplifiers possessing low splice losses between the amplifying fiber portion and the line fibers, and possessing spectral attenuation compatible with the required pumping efficiencies.

Optical fiber manufacture comprises two successive steps, namely making a preform, and drawing said preform down to obtain an optical fiber.

Chemical vapor deposition (CVD) type techniques as summarized in the document entitled "Preform technologies for optical fibers" by D. Dorn and C. Le Sergent, published in "Electrical Communication", Vol. 62, No. 3/4, 1988, can be used for making a preform out of polymer or fluoride glass, but that does not give satisfactory results, particularly in terms of attenuation. Under such circumstances, a technique of the "built-in casting" type is then used, which technique is well known to the person skilled in the art and is described in the article by S. Mitachi, T. Miyashita, and T. Kanamori published in Electronics Letters, Vol. 17, pp. 591 et seq. (1981). That technique uses a hollow cylindrical mold having a closed bottom. Molten glass material for forming the cladding is poured into the mold. Before the cladding glass material forming a solid cylinder in the mold has solidified completely, a cylindrical central portion is removed from the solid cylinder and the resulting void is filled in with molten core glass material. As a result, after cooling, an initial preform is obtained in the form of a bar having a central core zone and a peripheral cladding zone. During the fiber-drawing step, the optical fiber is drawn from said preform. The fiber comprises both a core and cladding surrounding the core. The ratio of core diameter to fiber diameter is identical to the ratio of core zone diameter to preform diameter. Diameter ratio (core diameter/total diameter) is thus conserved between preform and fiber.

To obtain a monomode optical fiber, i.e. one in which only one mode propagates, it is necessary for the fiber to possess a core of diameter that is small in terms of the wavelengths used. Unfortunately, the "built-in casting" technique, like the so-called "suction casting" and "rotational casting" techniques respectively described in articles by Y. Ohishi, S. Sakaguichi, and S. Takahashi, Electronics Letters, Vol. 22, pp. 1034 et seq. (1986) and by D. C. Tran, C. F. Fisher, and G. H. Sigel, Electronics Letters, Vol. 18, pp. 657 et seq. (1982), does not enable an initial preform to be made having a core diameter that is sufficiently small. In a known method, the initial preform is stretched to form a "mother" preform possessing a core zone of diameter smaller than that of the initial preform. This mother preform is then inserted into an outer tubular sleeve of cladding glass, such that after drawing down, an optical fiber is obtained possessing the desired ratio of core diameter to fiber diameter. For example, the outer tube may be obtained by centrifuging or "rotational casting". If the outer tube does not enable the desired ratio to be obtained, a second mother preform can be made by stretching the first mother preform with its outer tube. This second mother preform is then inserted into a second outer tube. The operation of inserting a mother preform into an outer tube can thus be repeated as many times as necessary to achieve the desired ratio. It is also possible to insert the mother preform into a plurality of concentric outer tubes and to draw the fiber from the resulting assembly.

The fiber-drawing step consists in heating one of the ends of the assembly made up of mother preform and outer tube and in drawing an optical fiber from the preform that is melted in this way by heating. As shown in FIG. 1, which is a longitudinal section through such an assembly 1, the mother preform 11 is inserted into the outer tube 10 and leaves an empty volume 12 between the cylindrical outside surface of the mother preform 11 and the cylindrical inside surface of the outer tube 10. During the fiber-drawing step, very intense heating is applied to the assembly 10–11 so as to obtain local melting in the peripheral cladding zone 110 of the mother preform 11 and in the outer tube 10 so as to fill in the initially empty volume 12.

This intense heating suffers from the major drawback of imparting deformation and eccentricity to the core zone 111 of the mother preform 11, and consequently of imparting deformation and core eccentricity to the resulting optical fiber, and this is very damaging to the quality of the fiber. For example, such deformation and core eccentricity of the fiber leads to high losses when making splices between a line fiber of silica glass and a portion of amplifying fiber of fluoride glass in order to make an optical amplifier.

The present invention seeks to remedy the above-mentioned drawback. A first object of the invention is to provide a monomode preform suitable for making a monomode optical fiber. A second object of the invention is to provide a method of manufacturing such a monomode optical fiber. Another object of the invention is to provide a monomode optical fiber possessing a core that is substantially circular and centered.

To this end, according to the invention, a monomode preform comprising a mother preform housed in an outer tube and leaving an empty volume between an outside surface of the mother preform and an inside surface of the outer tube, is characterized in that an intermediate tube is inserted in said empty volume, the intermediate tube possessing viscosity at fiber-drawing temperature which is less than the viscosity(ies) at fiber-drawing temperature of said mother preform and of said outer tube.

In an embodiment, the preform is made of fluoride glass, said intermediate tube possessing a vitreous transition temperature lower than the vitreous transition temperature(s) of said mother preform and of said outer tube.

The core zone of the mother preform may be doped with rare earth ions.

The invention also provides a method of manufacturing a monomode optical fiber comprising the step of drawing a fiber from a monomode preform of the above-described type. By way of example, the fiber-drawing temperature lies substantially in the range 320° C. to 330° C.

To manufacture a doped monomode optical fiber, fiber-drawing is performed on a preform whose core zone is doped.

Such a doped optical fiber can be used to make an optical amplifier or a laser source.

Other characteristics and advantages of the present invention appear more clearly on reading the following description given with reference to the corresponding accompanying drawings, in which:

FIG. 1, described above, is a fragmentary longitudinal axial section view of an outer tube having a mother preform inserted therein to make a monomode optical fiber by the prior art method;

FIG. 2 is a fragmentary longitudinal axial section view of an outer tube into which there have been inserted both a mother preform and an intermediate tube for making a monomode optical fiber in accordance with the invention;

FIG. 3 is a diagram showing how the FIG. 2 preform is drawn into a fiber; and

Figure 1:
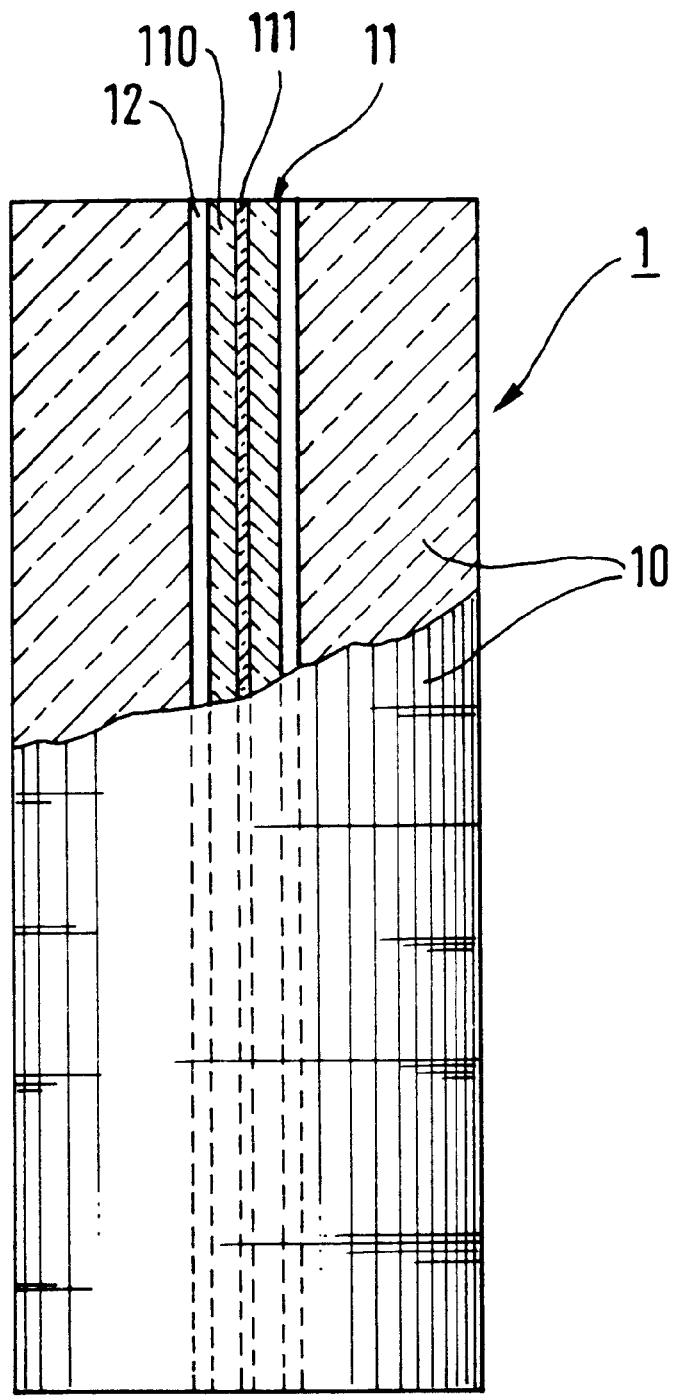

With reference to FIG. 2, a preform 2 of the invention, typically a monomode preform, comprises a mother preform 22 received in an outer tube 20. They are held securely relative to each other by mechanical means (not shown). In addition, an intermediate tube 21 that is not held and that has been obtained by centrifuging is disposed between the mother preform 22 and the outer tube 20. The intermediate tube 21 possesses viscosity at the fiber-drawing temperature which is lower than the viscosity(ies) at the fiber-drawing temperature of the mother preform 22 and of the outer tube 20. The mother preform 22 comprises a core zone 221 and a peripheral cladding zone 220 around the core zone 221.

In a preferred embodiment of the invention, the preform is made of fluoride glass. In this embodiment, the characteristic whereby the intermediate tube 21 possesses viscosity at the fiber-drawing temperature that is less than the viscosity(ies) at the fiber-drawing temperature of the mother preform 22 and of the outer tube 20 means that the intermediate tube 21 possesses a vitreous transition temperature lower than the vitreous transition temperature(s) of the mother preform and of the outer tube.

By way of example, the core zone 221 is defined by a molar composition substantially equal to:

| $ZrF_4$ | $BaF_2$ | $LaF_3$ | $AlF_3$ | NaF |
|---|---|---|---|---|
| 54% | 23% | 4% | 3% | 16% | and has a refractive index close to 1.503.

The sheath zone 220 and the outer tube 20 are defined by a molar composition substantially equal to:

| $ZrF_4$ | $BaF_2$ | $LaF_3$ | $AlF_3$ | NaF |
|---|---|---|---|---|
| 53% | 19% | 4% | 4% | 20% | and they posses a refractive index close to 1.498.

The intermediate tube 21 is defined by a molar composition substantially equal to:

| $ZrF_4$ | $BaF_2$ | $LaF_3$ | $AlF_3$ | NaF | LiF |
|---|---|---|---|---|---|
| 52% | 18% | 4% | 4% | 20% | 2% | and it possesses a refractive index close to 1.499.

It should be observed that the index difference between the cladding zone and the core zone can be much larger, particularly for an amplifying fiber.

In the above tables, Zr, Ba, La, Al, Na, Li, and F designate respectively zirconium, barium, lanthanum, aluminum, sodium, lithium, and fluorine.

Thus, by way of explanation, the core zone 221 comprises 54% zirconium tetrafluoride, 23% barium bifluoride, 4% lanthanum trifluoride, 3% aluminum trifluoride, and 16% sodium monofluoride.

The fiber-drawing temperature of the preform lies substantially in the range T=320° C. to T=330° C. At this temperature, the core zone 221 is defined by a viscosity that is equal to about $10^6$ Po, the cladding zone 220 and the outer tube 20 by a viscosity equal to about $10^{5.5}$ Po, and the intermediate tube 21 by a viscosity equal to about $10^5$ Po. Po is the abbreviation for the Poise unit of measurement which is equal to 0.1 pascal-seconds.

As shown in FIG. 3, fiber-drawing comprises the step 25 of heating one of the ends of the preform, typically by means of an oven, and the step 24 of drawing the fiber F from said heated preform. Inside the preform, both between the outside cylindrical surface of the intermediate tube 21 and the inside cylindrical surface of the outer tube 20, and also between the inside cylindrical surface of the intermediate tube 21 and the outside cylindrical surface of the mother preform 22, there exist cylindrical volumes 23 that are empty of any preform material. Given that the intermediate tube 21 possesses viscosity at the fiber-drawing temperature which is less than the viscosity(ies) at the fiber-drawing temperature of the mother preform 22 and of the outer tube 20, heating gives rise to "softening" of the intermediate tube 21 as shown in the bottom portion of the preform in FIG. 3, thereby filling the empty volumes both between the cylindrical outside surface of the intermediate tube 21 and the cylindrical inside surface of the outer tube 20, and between the cylindrical inside surface of the intermediate tube 21 and the cylindrical outside surface of the mother preform 22. The material constituting the intermediate tube 21 is intended to become an integral portion of the resulting optical fiber F.

Since the intermediate tube 21 possesses viscosity at the fiber-drawing temperature which is less than the viscosity at the fiber-drawing temperature of the mother preform 21 and of the outer tube 20, the fiber-drawing temperature delivered by the heating 25 can be much lower than the prior art fiber-drawing temperature for preforms of the type shown in FIG. 1. It is not necessary to apply as high a fiber-drawing temperature as in the prior art for the purpose of filling the empty volumes 23. This gives rise to less eccentricity and to less deformation of the core of the fiber F. In addition, this lower temperature minimizes the risk of crystallization which is partially responsible for attenuation.

Figure 4:
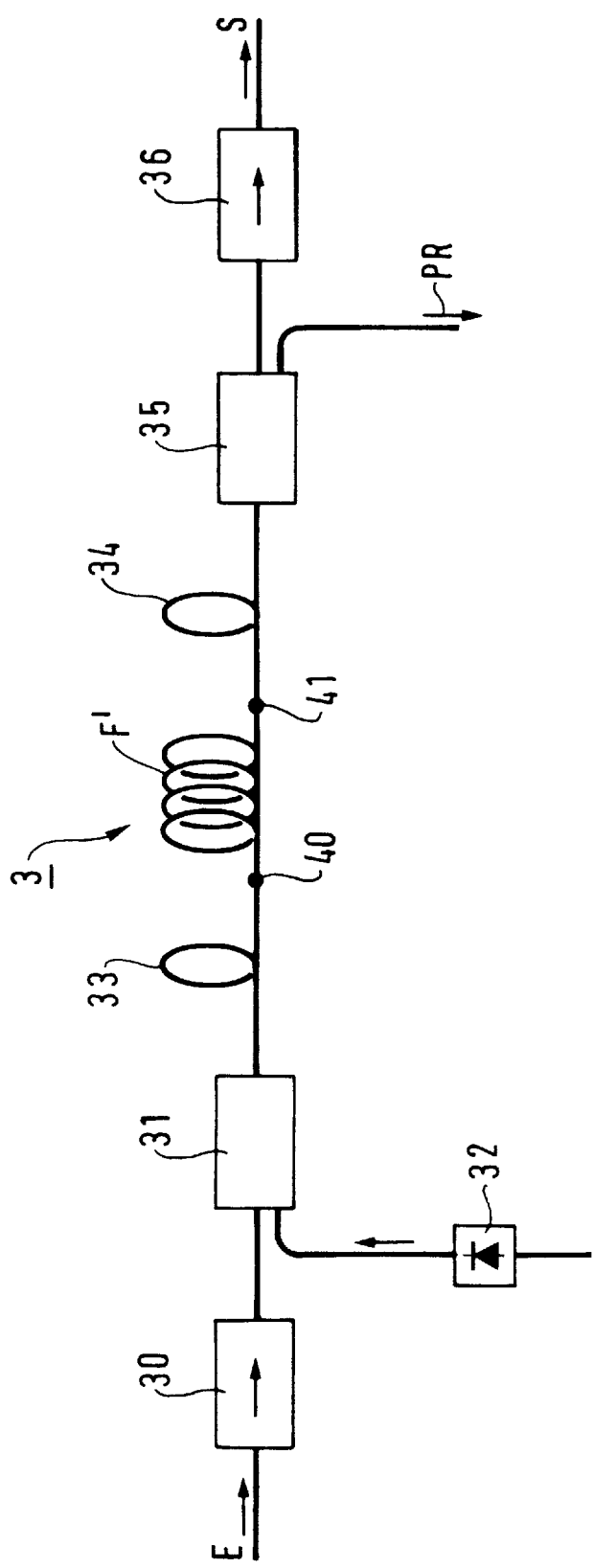
FIG. 4 shows an optical amplifier.

The invention can be applied to making an optical amplifier 3 of the type shown in FIG. 4. The amplifier 3 comprises in cascade: an isolator 30; a multiplexer 31; a first portion of intermediate fiber 33; a portion of amplifying fiber F' in accordance with the invention; a second portion of intermediate fiber 34; a demultiplexer 35; and an isolator 36. On two respective inputs, the multiplexer receives the signal from the isolator 30 and a pump signal produced by a diode 32. On one of its two outputs, the demultiplexer 35 produces a residual pump signal PR.

Silica fibers are doped with rare earth ions of the neodymium type to provide a fiber amplifier capable of amplifying an optical signal in the spectrum range 1.30 μm to 1.36 μm. However, undesirable effects limit the performance of such silica fiber amplifiers. A fluoride glass fiber is therefore used which is doped with rare earth ions (known as ZBLAN) of the praseodymium type $Pr^{3+}$ for wavelengths of 1.3 μm or of the erbium type $Er^{3+}$ for wavelengths of 1.55 μm. The amplifying doped fiber F' is connected in series between the first intermediate fiber portion 33 and the second intermediate fiber portion 34 by splicing at 40 and 41. The splices 40 and 41 are typically made by means of an index-matching adhesive. Rare earth ion doping is performed in the core zone 221 during manufacture of the mother preform (FIGS. 2 and 3). Since the core of a fiber F' that results from drawing down such a preform is particularly well centered and circular, losses at the splices 40 and 41 are very low, typically 0.15 dB.

It is also possible to use an optical fiber of the invention which is doped with rare earth ions to constitute a laser source. The laser source then comprises two resonance reflector means at opposite ends of the doped fiber portion.

It should be observed that the above description of the invention is limited to considering only one outer tube 20. Nevertheless, a plurality of concentric outer tubes can be used to form the preform, in which case the facing outside and inside surfaces of two consecutive outer tubes receive between them an intermediate tube possessing viscosity at the fiber-drawing temperature which is lower than the viscosity(ies) at the fiber-drawing temperature of said outer tubes.

What is claimed is:

1. A preform made of fluoride glass and for a monomode optical fiber, the preform comprising a mother preform (11; 22) housed in an outer tube (10; 20) and leaving an empty volume between an outside surface of the mother preform and an inside surface of the outer tube, characterized in that an intermediate tube (21) is inserted in said empty volume, the intermediate tube possessing viscosity at a fiber-drawing temperature which is less than the viscosity(ies) at said fiber-drawing temperature of said mother preform (22) and of said outer tube (20).

2. A preform according to claim 1, characterized in that said intermediate tube (21) possessing a vitreous transition temperature lower than the vitreous transition temperature of said mother preform and of said outer tube.

3. A method of manufacturing a monomode optical fiber, characterized in that it includes the step (23, 24) of drawing a fiber from a monomode preform according to claim 2.

4. A method according to claim 3, characterized by said fiber-drawing temperature lying substantially in the range 320° C. to 330° C.

5. A preform according to claim 1, characterized in that the core zone of said mother preform is doped with rare earth ions.

6. A method of manufacturing a doped monomode optical fiber, characterized in that it includes the step (23, 24) of drawing a fiber from a preform for a monomode optical fiber according to claim 5.

7. A method of manufacturing a monomode optical fiber, characterized in that it includes the step (23, 24) of drawing a fiber from a preform for a monomode optical fiber according to claim 1.

8. A monomode optical fiber made by a method comprising the steps of:

providing a preform made of fluoride glass and comprising a mother preform housed in an outer tube and leaving an empty volume between an outside surface of the mother preform and an inside surface of the outer tube, characterized in that an intermediate tube is inserted in said empty volume, the intermediate tube being of a material possessing viscosity at a fiber-drawing temperature which is less than the viscosity(ies) at said fiber-drawing temperature of said mother preform and of said outer tube; and drawing an optical fiber from said preform while retaining the material of said intermediate tube as an integral portion of said monomode optical fiber.

9. A monomode optical fiber according to claim 8, wherein said intermediate tube material possesses a vitreous transition temperature lower than a vitreous transition temperature of said mother perform and said outer tube.

10. A monomode optical fiber according to claim 9, wherein said drawing step utilizes a fiber-drawing temperature lying substantially in the range 320° C. to 330° C.

11. A doped monomode optical fiber made by a method comprising the steps of:

providing a preform made of fluoride glass and comprising a mother preform housed in an outer tube and leaving an empty volume between an outside surface of the mother preform and an inside surface of the outer tube, characterized in that an intermediate tube is inserted in said empty volume, the intermediate tube being of a material possessing viscosity at a fiber-drawing temperature which is less than the viscosity(ies) at said fiber-drawing temperature of said mother preform and of said outer tube, and said mother preform having a core zone doped with rare earth ions; and drawing an optical fiber from said preform to form said monomode optical fiber while retaining a material of said intermediate tube as an integral portion of said monomode optical fiber.

12. An optical amplifier including a portion of optical fiber according to claim 11.

13. A laser source including a portion of optical fiber according to claim 11.

14. A doped monomode optical fiber according to claim 11, wherein said intermediate tube material possesses a vitreous transition temperature lower than a vitreous transition temperature of said mother perform and said outer tube layer.

* * * * *